Aug. 7, 1956        T. ALLAN        2,757,543

ADJUSTABLE ROCKING MECHANISM

Filed July 29, 1954

INVENTOR.
THOMAS ALLAN
BY
ATTORNEY.

United States Patent Office 2,757,543
Patented Aug. 7, 1956

2,757,543

ADJUSTABLE ROCKING MECHANISM

Thomas Allan, Hawthorne, N. Y., assignor to General Precision Laboratory Incorporated, a corporation of New York Application July 29, 1954, Serial No. 446,542

3 Claims. (Cl. 74—25)

This invention relates to mechanisms for converting rotary motion into rocking motion wherein the amplitude is continuously adjustable during operation from maximum through zero.

This invention provides apparatus for converting continuous rotary motion into rocking or oscillating rotary motion, the apparatus being adjustable while in operation to change the length of the circular arc traversed by the oscillating motion. The nature of the oscillating motion resembles simple harmonic motion, the acceleration being proportional to the displacement angle of the circular path of motion.

The apparatus by which this invention is carried out consists generally of a motor rotating continuously in a selected sense at a constant speed. A speed reducing mechanism, which may be adjustable, connects the motor shaft to a crank. The crank is provided with an oblique crank pin which intercepts the extended shaft axis so that points on the moving oblique crank pin describe circles of various diameters. A yoke in a plane perpendicular to the shaft axis surrounds the oblique crank pin and bears on it, so that the yoke has a circular motion in a plane at right angles to the shaft axis. Provision is made for adjustment of the relative positions of the yoke and oblique pin in the axial direction. The yoke is guided by slide bars or a Scotch yoke and through a rack and sector gear rocks a table.

The purpose of this invention is to provide a mechanical device for converting continuous rotary motion into adjustable oscillating rotary motion.

Further understanding of this device may be secured from the detailed description and drawings, in which.

Figure 1:
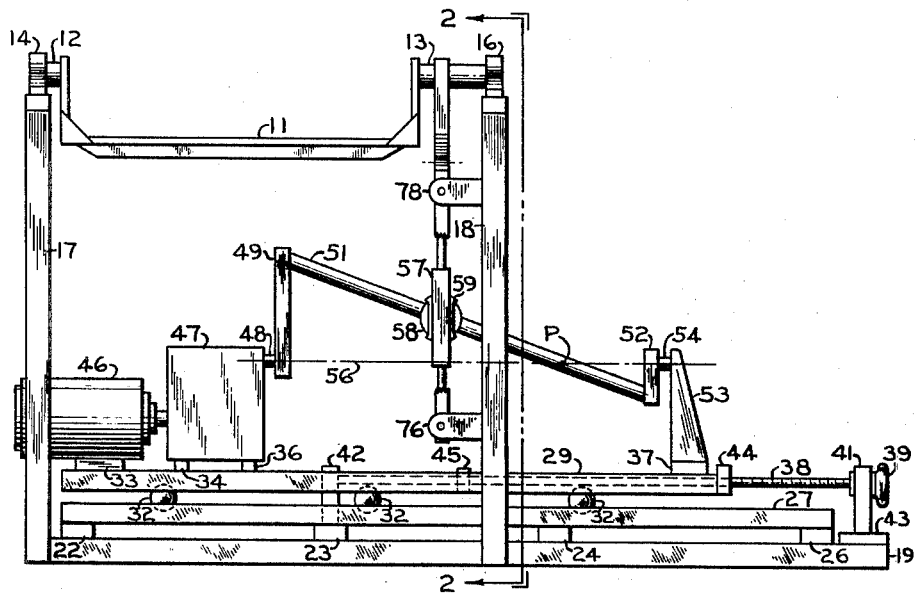
Figure 1 is a side view of the adjustable rocking mechanism.
Figure 2:
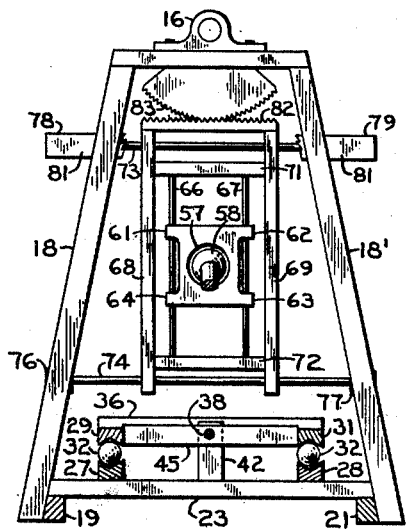
Figure 2 is a sectional view of Fig. 1 at the line 2—2.

Referring now to Figs. 1 and 2, a rocking platform 11 is provided with two trunnions 12 and 13 journalled in bearings 14 and 16 supported by A frames 17 and 18. The feet of the A frames are secured to longitudinal base members 19 and 21 which are braced at intervals by transverse frame members 22, 23, 24 and 26. Secured to these transverse members are a pair of rails 27 and 28, each provided with a V-groove in its upper face. A similar pair of rails 29 and 31 having V-grooves in their lower faces are carried by several balls 32 rolling in the grooves of rails 27 and 28. The upper rails are fastened together by several cross members 33, 34, 36 and 37 to form a rigid platform which can roll easily in the lengthwise direction. This platform is held and positioned by a screw 38 and handwheel 39 captured in bearing brackets 41 and 42. These brackets are secured to transverse base members 24 and 43. The screw 38 passes through threaded holes in carriage cross members 44 and 45, thus moving the carriage when turned.

One purpose of providing the threaded rod 38, nuts 44 and 45 and handwheel 39 is to enable adjustment to be made of the yoke radius while the device is in motion. Another and very important purpose is to permit adjustment at a remote point so that the device may be both operated and adjusted remotely. This permits operation of the device in a sealed test chamber. When handwheel 39 is employed, the wall of the test chamber or other enclosure may intersect the shaft at the pedestal 41. In other cases it has been found convenient to remove handwheel 39 and to extend the threaded shaft 38 by a flexible shaft, through a shaft seal in the wall of the chamber, to a convenient external adjusting station.

A motor 46 and speed reducing gear box 47 are mounted on the carriage cross members 33, 34 and 36. The gear box 47 has a low speed output shaft 48 to which is secured a crank 49. An oblique crank pin 51 is rigidly secured at one end to crank 49, and at the other end the pin is rigidly secured to an idler crank 52. Crank 52 is journalled in a bracket 53 carried by the carriage cross member 37. The journal 54 is in line with gear box shaft 48, and the longitudinal center line of oblique crank pin 51 intersects the common axis of shaft 48 and journal 54, represented by the line 56, at the point P.

When the motor 46 is operated, turning crank 49, the oblique pin 51 is rotated forcing idler crank 52 to rotate. The center line of the oblique pin 51 at all times during rotation intersects axis 56 at point P, but all other points of the center line of oblique pin 51, since they do not lie on the axis 56, describe circles around that axis. These circles decrease in radius from maximum at crank 49 to zero at point P, then increase again from point P to the idler crank 52. Thus all points of the crank pin center line have motion of circular translation about the shaft axis except point P lying on that axis. In addition, the crank pin revolves about its own center line once in each revolution of the shaft.

A yoke 57 contains a sphere or ball 58 held in a spherical bearing 59 to form a universal ball bearing which can rotate within limits in any direction. The ball 58 is pierced with a diametral round hole slidably fitting oblique pin 51, which passes through the hole. Alternatively, in place of ball 58 a self-aligning radial bearing carrying an obliquely fitted tube for rod 51 can be used. The yoke 57 is provided with four ears 61, 62, 63 and 64 each containing vertical holes into which are slidably fitted two round vertical slide rods 66 and 67. These rods are held in a vertical frame consisting of side members 68 and 69 and end members 71 and 72. The side members 68 and 69 have round horizontal holes near their ends slidably fitted on two horizontal slide rods 73 and 74. The ends of these rods are held in brackets 76 and 77, and 78 and 79 respectively. Brackets 76 and 77 are secured directly to A-frame members 18 and 18', while brackets 78 and 79 are secured to a bar 81 which is in turn secured to A-frame members 18 and 18'. By these means the yoke 57 is given freedom to move both horizontally and vertically, so that, as it is rotated in a circle by the movement of the oblique pin passing through it, the slide moves in the horizontal and vertical linear components of the circular movement imparted to the yoke. These movements are similar and their displacements have the characteristics of simple harmonic motion.

Of the two motions, horizontal and vertical, of yoke 57 along its slides, the horizontally directed motion only is utilized. A rack gear 82 is secured in a horizontal position to the upper ends of side members 68 and 69. A sector gear 83 meshing with rack 82 is axially secured to trunnion 13, so that movement of gear 83 moves trunnion 13, and through it the platform 11. Thus the reciprocating motion of rack 82 causes limited rocking motion of sector gear 83 and of platform 11. Since the motion of rack 82 is simple harmonic, the motion of the periphery of sector gear 83, geared to it, and of every point of the platform 11 must have a similar nature. That is, the reciprocating or oscillating circular motion of every point of the rocking platform has at any instant an acceleration proportional to its displacement angle.

By turning knob 39 and the attached screw 38, the rolling carriage is moved longitudinally on balls 32 and moves the oblique pin 51 through the hole in the sphere 58 of yoke 57, changing the radius R of the circle described by the yoke when the oblique pin is in circular motion. This changes the angular limits of the rocking motion of the platform 11 in direct proportion, the relation being $$R = r\theta$$

in which $r$ is the radius of the sector gear 83 and $\theta$ is the angular limit of motion of the platform 11, in radians.

The radius of throw of yoke 57 is adjustable when motor 46 is not running and also during operation. This adjustability includes adjustment to and through zero throw during operation, so that the limits of rocking of the rocking platform 11 may be made as small as desired. If the adjustment is carried through zero and beyond, the phase of the rocking is reversed in sense. That is, when the yoke 57, Fig. 1, is to the left of point P and in Fig. 2 is to the left of the center line, then the platform will also be to the left of the center line of Fig. 2. If now, at the same position of crank 49, the yoke 57 be moved to the right of point P, Fig. 1, the rocking platform will be to the right of the center line of Fig. 2.

It is obvious that, instead of utilizing the horizontal component of the yoke 57 to rock the platform, the vertical movement could be utilized to produce a rocking motion. This could be done by reversing the positions of the vertical and horizontal slide rods so that the yoke would slide horizontally in a frame which in turn would slide vertically on rods secured to the A-frame. This vertical motion would then be translated to rocking motion employing a vertical gear rack meshing with a gear sector.

What is claimed is:

1. An adjustable rocking mechanism comprising, a driving crankshaft, a crank secured thereto, an oblique crank pin secured at one end to said crank and axially intersecting the extended axis of said driving crankshaft, crank and journal means for rotatably supporting the other end of said oblique crank pin, a yoke slidingly and rotatably fitted around said oblique crank pin, means for moving said oblique crank pin axially relative to said yoke, a pair of orthogonal sliding members in a plane normal to said crankshaft axis, said members being secured to said yoke and deriving therefrom at one of said members a linear component of the circular translatory motion of the yoke.

2. An adjustable rocking mechanism comprising, a driving crankshaft, driving means for rotating said driving crankshaft at a selected speed, a crank secured to said driving crankshaft, an oblique crank pin secured at one end to said crank and axially intersecting the extended axis of said driving crankshaft, a second crank secured to the other end of said oblique crank pin, a journal secured to said second crank, said journal being supported for free rotation about said extended axis, a yoke slidably and rotatably fitted around said oblique crank pin, a sliding platform supporting said driving crankshaft, said driving means, said oblique crank pin, said second crank and said journal, means for adjusting the position of said sliding platform for moving said oblique crank pin through said yoke whereby the radius of circular translatory motion of said yoke is adjusted, a first sliding member secured to said yoke, and a second sliding member orthogonally secured to said first sliding member whereby circular translatory motion of said yoke causes linear reciprocating motion of said second sliding member.

3. An adjustable rocking mechanism comprising, a driving crankshaft, driving means for rotating said driving crankshaft at a selected speed, a crank secured to said driving crankshaft, an oblique crank pin secured at one end to said crank and axially intersecting the extended axis of said driving crankshaft, a second crank secured to the other end of said oblique crank pin, a journal secured to said second crank, said journal being supported for free rotation about said extended axis, a yoke slidably and rotatably fitted about said oblique crank pin, a fixed frame member including guideway members disposed in a plane normal to said extended axis, a slidable frame mounted on said guideway members for longitudinal movement thereon, said slidable frame including guideway members orthogonally disposed as respects said first mentioned guideway members, means for slidably mounting said yoke on said second mentioned guideway members, a sliding platform supporting said driving crankshaft, said driving means, said oblique crank pin, said second crank and said journal, and means for adjustably positioning said sliding platform relative to said fixed frame member in a direction parallel to said extended axis whereby the position of said yoke is adjusted along the length of said oblique crank pin.

References Cited in the file of this patent
UNITED STATES PATENTS

| | | |
|---|---|---|
| 2,319,485 | Alabrune | May 18, 1943 |
| 2,452,496 | Schneider et al. | Oct. 26, 1948 |
| 2,512,185 | Thompson | June 20, 1950 |